Nov. 14, 1944.  L. T. WEAGLE  2,362,872

SPIRIT DEVICE

Filed March 6, 1943

INVENTOR
LAWRENCE T. WEAGLE
BY
Charles McClair
ATTORNEY

Patented Nov. 14, 1944

2,362,872

UNITED STATES PATENT OFFICE 2,362,872

SPIRIT DEVICE

Lawrence T. Weagle, Oakmont, Pa., assignor to Radio Corporation of America, a corporation of Delaware Application March 6, 1943, Serial No. 478,299

2 Claims. (Cl. 33—211)

My invention relates to spirit indicating devices and particularly to devices wherein the position of a bubble or meniscus is utilized to give an indication of level, pressure, height or other physical condition.

The lack of high contrast is often objectionable in observing or reading an indication of a physical condition by means of a bubble such as used in common spirit levels or a meniscus such as encountered in various pressure indicating devices, rendering the observation of such devices difficult and often resulting in an erroneous reading. In addition, such devices are often used where the diffused lighting conditions are inadequate, the use of a concentrated light source adjacent the device being objectionable because of reflections from the device itself. Furthermore, the legibility of such devices is low, being dependent merely upon differences in reflection or light transmission of the bubble or meniscus.

It is an object of my invention to increase the legibility of spirit indicating devices provided with a bubble or meniscus indicating means. It is another object to provide a spirit device with which a physical condition such as the state of level, height or pressure may be determined under adverse lighting conditions, and it is a further object to provide a device of the type described having high legible contrast whereby reading of the spirit indication is facilitated. In accordance with my invention I provide a light transparent liquid, the liquid forming a bubble or meniscus for the purpose of providing a visible indication, and I distribute a luminescent material in proximity to the liquid filling and a guide line or lines masking or otherwise obstructing a portion of the luminescent material from view whereby, upon excitation of the luminescent material, visible light appears to be concentrated by the bubble or meniscus to give a highly legible indication of the bubble or meniscus position observable by contrast on a luminous background of lower intensity. These and other objects, features and advantages of my invention will become apparent when taken in connection with the accompanying drawing wherein:

Figures 1, 2:
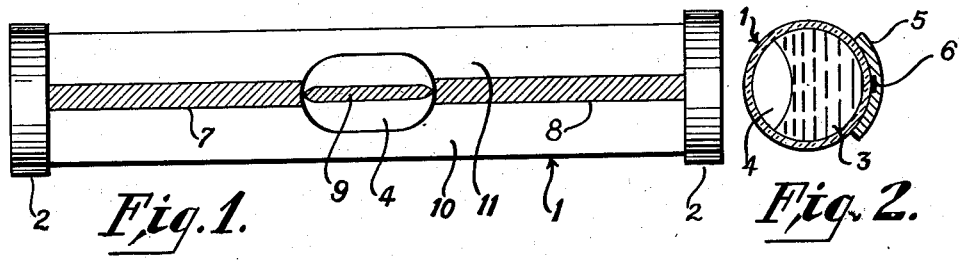
Figure 1 is a longitudinal view of a spirit indicating device made in accordance with my invention.
Figure 2 is a cross-sectional view thereof.

Figures 3, 5 and 7, and 4, 6 and 8 are views corresponding to those of Figures 1 and 2 showing various modifications of my invention.

I will describe my invention with particular reference to a spirit indicating device of the spirit level type, although it should be appreciated that my invention is not limited to this particular application inasmuch as it is equally applicable to other devices utilizing a bubble or meniscus indicating means.

Referring to Figure 1, I have shown a transparent tubular container 1, preferably of elongated form and circular cross-section, the container preferably being of glass or transparent plastic which is closed at opposite ends by closure caps 2 and is partially filled with a transparent liquid 3 leaving a bubble 4 of lower density and lower refractive index than the liquid. Preferably the container 1 is provided with a slight camber so that when in a horizontal position as shown in Figure 1 the central part thereof is slightly higher than the end portions, allowing the bubble 4 to assume a position as shown. In accordance with my invention I have found that an increase of illumination is obtained over the bubble area with respect to the surrounding areas for light emitted under the surface of the bubble, such an action increasing the visible contrast over the bubble area with respect to the surrounding areas. Therefore, in accordance with my invention, I provide a luminous material either embedded in the container or on the surface thereof and on the opposite side of the bubble 4 from the observer and I preferably excite the material to luminescence such as by exposure to light through the container 1 and the liquid filling 3.

Referring to Figure 2, I have shown a coating of luminescent material 5 directly in contact with the container 1 to develop and project light through the adjacent wall of the container and in the direction of the bubble 4. Preferably, the coating 5 is in direct contact with the rear surface of the container 1. The percentage of contact between the coating 5 and the container is preferably high so that light developed by the coating is more readily diffused into and through the container. Further, in accordance with my invention, I provide a guide line which is imaged on the bubble to further increase the visible contrast. As shown in Figures 1 and 2, the guide line may comprise a single member of opaque material 6 located directly beneath the bubble volume and shielding a portion of the light developed by the luminescent material 5. When this line is viewed as shown in Figure 1, the image portions 7 and 8 appearing one on each side of the bubble 4 appear wider than the width of the opaque material guide line due to the refraction of the container and liquid filling. However, the guide line developed by the material 6 over the bubble area appears relatively narrow as shown at 9. In addition, this portion of the guide line 9 appears to be more dense than the adjacent portions 7 and 8, rendering the position of the bubble 4 more definite. With the arrangement shown in Figure 1 and when observed from a position normal to the plane of the drawing, the entire container 1 appears to be illuminated so that the areas 10 and 11 are visible with a soft glowing light, whereas the bubble 4 is illuminated to a greater degree by reason of the lens action produced by the bubble. Fundamentally, the bubble comprises a liquid-concave glass-convex lens having high light gathering power from the luminescent material 5. Consequently, the outline of the bubble 4 is instantly discernible by visual contrast with respect to the lower intensity luminescent background. In addition, the apparent opacity of the guide line over the portion 9 is accentuated, with the guide line portions 7 and 8 appearing of lower density. Each of these factors contributes to high legibility and an accurate observation of the bubble position.

The luminescent material 5 may be of any of several types either self-luminous or luminescent under radiant energy excitation. For example, the material 5 may be of the inorganic type such as a coating of zinc sulphide having high phosphorescent properties such as described by Leverenz in his publication "Cathodoluminescence," RCA Review, October, 1940, page 167. Such materials are of crystalline form and are preferably applied as a suspension in clear lacquer. Such application results in effectively high optical contact with the container so that the luminescence therefrom is diffused into the container without substantial reflection from the wall thereof. Alternatively, the material 5 may comprise an organic luminescent material applied as above, although the phosphorescence following excitation to luminescence of such materials is relatively low requiring continuous excitation from an auxiliary light source, whereas the zinc sulphide material referred to may be excited periodically in lieu of continuous excitation. Still further, the material 5 may comprise a radio active composition which is normally self-luminous. Similarly, the material 5 need not be in the form of a coating on the external surface of the container 1 but may be incorporated in the glass or plastic wall of the container.

Figures 3, 4:
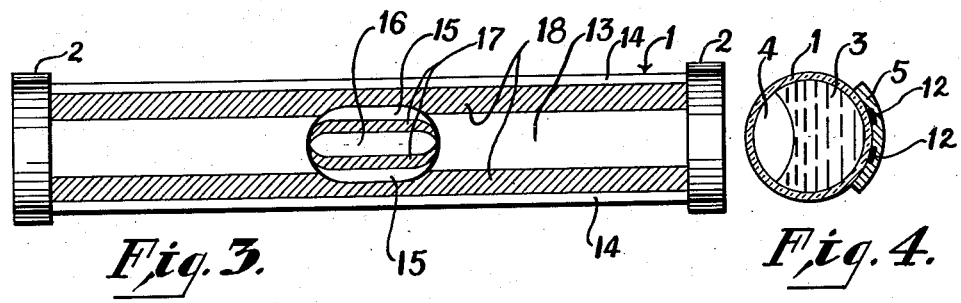

Increased visual contrast may be obtained by the use of two guide lines relatively close together as shown in Figures 3 and 4 wherein the guide lines 12 are of opaque preferably black material surrounded by the luminescent material 5. With this modification of my invention the luminescent material 5 is visible through the completely filled portion of the container 1 such as over the areas 13 and 14, the light being concentrated in the bubble areas 15 and 16. It will be noted that the areas 15 and area 16 are separated by the guide line image portions 17 and that the illuminated portions 15 of the bubble apparently overlap and extend within the range of the guide line images 18 visible over the entire length of the container and the liquid filling.

Figures 5, 6:
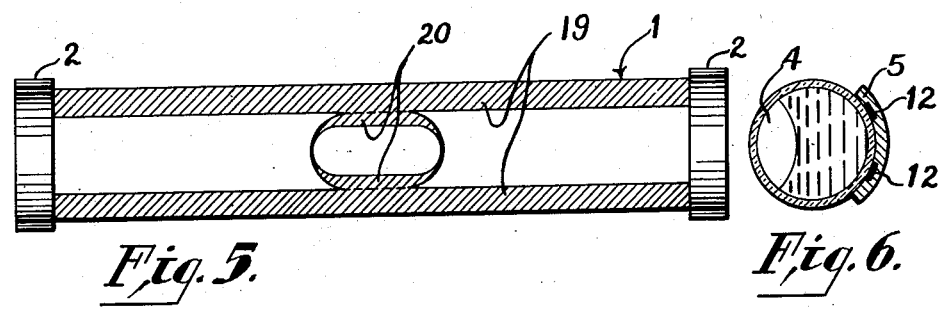

A further modification is shown in Figures 5 and 6 wherein the guide lines 12 are more widely separated than shown in Figures 3 and 4 so that the lines 19 visible through the liquid are tangent with the line portions 20 over the bubble margins. In this modification, as well as in that shown in Figures 7 and 8, the advantage accrues that transverse reference lines (not shown) may be used without visual interference by the guide lines.

Figures 7, 8:
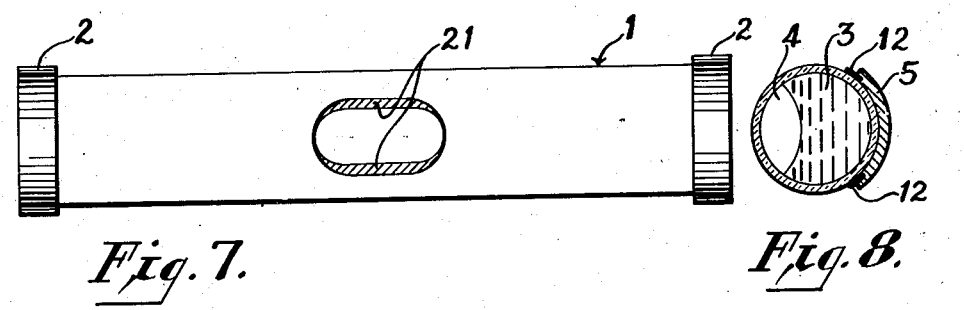

The guide lines 12 shown in Figures 7 and 8 are still more widely separated along the rear periphery of the container 1 so that they are invisible over the length of the container 1 except for over the margins of the bubble area as shown at 21.

In all of the modifications shown the principle underlying my invention applies in that the light from the luminescent coating is concentrated over the bubble area and apparently decreased, by comparison therewith, over the remaining length of the container. Furthermore, in all of my modifications except that of Figures 7 and 8 the guide line image or images appearing within the bubble area appear denser than the guide line images extending over the filled portions of the container. While this is not true of Figures 7 and 8, this modification has the additional advantage of providing a sharply outlined highly visible bubble bounded by the guide lines on a completely luminous background.

The opaque material 5 shown in Figure 2 and the material of the guide lines 12 in Figures 4, 6 and 8 may be a black or other opaque lacquer applied to the external surface of the container 1, in which event the guide lines may be applied through a stencil. Alternatively, the guide lines may be formed in the container wall such as by using an opalescent or opaque glass line. However, if the device is to be utilized in the absence of all external lighting, the guide lines may be formed by voids between separated strips of luminescent material. The luminescent material may be applied, if of the sulphide type, by spraying a suspension of the material in a lacquer binder through a mask or stencil over the length of the container as is customary in the manufacture of luminescent screens. Such materials may likewise be incorporated directly in the container wall whether it be of glass or plastic, although such use is not as flexible for changing designs or varying applications.

I have made suitable devices in accordance with my inventions using alcohol or water as the liquid 2 in a glass container, both of these liquids being sufficiently transparent to light from an external source, such as an ultra-violet lamp, for excitation to luminescence of the luminescent material 4. For a zinc sulphide such as mentioned above a blue filter may be used in combination with an incandescent light source or a mercury vapor ultra-violet light source to provide excitation of the luminescent material. Periodic exposure to daylight is sufficient to render a zinc sulphide luminous so that during use in darkened areas such periodic excitation is normally sufficient for satisfactory use. Obviously, self-luminous materials require no periodic excitation or auxiliary light source, whereas organic luminescent materials require constant excitation.

The improved operation of my device may be explained by considering a device not utilizing my luminescent material coating and viewed by external light. For this purpose an incident light of 100% with 90% visible transmission through the container and liquid and 95% reflection from a white non-luminous background may be assumed. With such a structure the light from the bubble to the observer cannot exceed 80.6% of the incident light giving a maximum ratio of incident to useful reflected light of 0.806. However, with my device and assuming incident light of 10% visible and 90% invisible, such as ultra-violet, and with the same transmission and reflection coefficients and with a luminescent material conversion efficiency of 30%, the ratio of incident visible light to useful light may greatly exceed unity. Since the first mentioned ratio cannot possibly exceed unity, the contrast with the prior art device has a definite limited value whereas with my device the contrast may be 3.67 times that obtainable under the prior art using the above assumptions of incident light values, transmission, reflection and conversion efficiency. The above assumptions are not limiting in any sense inasmuch as a higher ratio of ultra-violet to visible light as well as higher luminescent conversion efficiencies may be obtained. The demarcation of the bubble outline is also further increased by the above increased ratio when using my luminescent background, since this increased ratio of useful emitted light provides an intensified darkening effect at the opposite ends of the bubble thereby rendering the position and outline of the bubble more readily discernible.

I claim:

1. A spirit level comprising an elongated container closed at opposite ends, a liquid partially filling said container leaving a bubble volume therein, a luminescent material coating one side of, extending lengthwise of, and visible through said container, a pair of opaque guide lines extending lengthwise of said container, said guide lines being sufficiently separated to provide elongated images thereof visible along the entire length of said container and separate images in said bubble volume, said luminescent material being visible between said separate images and between each of said separate images and said elongated images.

2. A spirit level comprising an elongated container closed at opposite ends, a liquid partially filling said container leaving a bubble volume therein, a luminescent material coating one side of, extending lengthwise of, and visible through said container, a pair of opaque guide lines extending lengthwise of said container, said guide lines being sufficiently separated to provide an image in said bubble volume and around the peripheral portion thereof, said luminescent material being visible inside and outside said image.

LAWRENCE T. WEAGLE.